United States Patent Office 3,157,685
Patented Nov. 17, 1964

3,157,685
PARTIAL ESTERS OF PHOSPHORIC ACID AND A METHOD OF PREPARING THEM
Karoly Szabo, Yonkers, N.Y., and Joseph R. Froli, Jr., San Jose, Calif., assignors to Stauffer Chemical Company, New York, N.Y., a corporation of Delaware
No Drawing. Filed Mar. 6, 1962, Ser. No. 177,739
3 Claims. (Cl. 260—461)

This invention relates to organophosphorus compounds and, in particular, to partial esters of phosphoric acid wherein one of the esterifying groups is an unsaturated radical. More specifically, the invention is concerned with allyl hydrogen arylphosphates and to a new and novel method of preparing them.

In its broadest aspects, the present invention contemplates a new class of partial diesters of phosphoric acid in which one of the esterifying groups is a lower unsaturated aliphatic radical and the other is an aryl radical and the provision of such partial esters and a novel method of preparing them constitute the primary objects and purposes of the invention.

Other objects will become manifest as the description proceeds.

The above described phosphoric diesters were discovered as a product of a new and unexpected chemical reaction involving the cleavage of a neutral triester of phosphoric acid at mildly elevated temperatures and in the presence of an amine salt. Included in the triester groupings is one aryl group and two unsaturated aliphatic groups of the allyl type. During the course of the reaction, an unsaturated aliphatic hydrocarbon residue is eliminated and the resulting diester obtained in the form of its amine salt. At the same time the acid radical of the amine salt becomes associated with the hydrocarbon fragment. Thus, in the event the amine salt is a hydrohalide, there is produced an aliphatic halide. For illustrative purposes, the reaction is depicted in the chemical equation outlined below in which the neutral triester is diallyl phenyl phosphate and the amine salt is triethylamine hydrochloride:

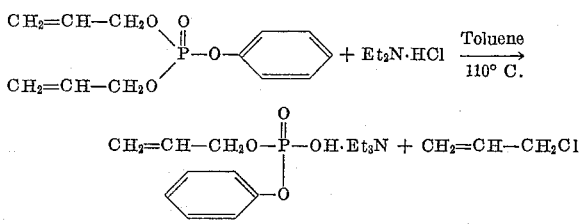

It has been our finding that the production of acidic diesters of phosphoric acid as contemplated herein is a general reaction provided the neutral phosphate starting material contains one aryl and two aliphatic ester groupings. The novel reaction has proved to be especially useful in synthesis of previously unobtainable allyl aryl phosphates belonging to the group represented by the following general formula:

I
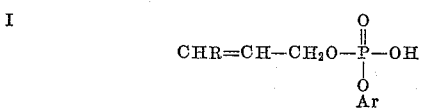

wherein R is hydrogen or a lower alkyl radical, e.g. methyl, ethyl, n-propyl, isobutyl, etc. and Ar designates an aromatic hydrocarbon residue of the benzene and naphthalene series wherein the hydrocarbon residue can be substituted by such organic groups as lower alkyl, lower alkoxyl, chlorine, bromine, nitro and the like. Exemplary compounds encompassed by the above depicted general formula include the following specific configurations:

Compound 1
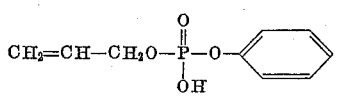

Compound 2
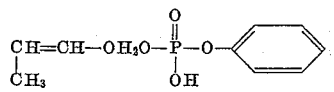

Compound 3
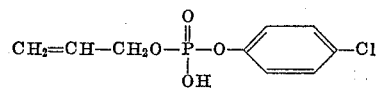

Compound 4
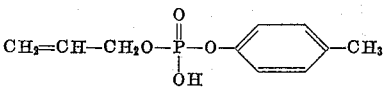

Compound 5
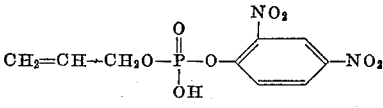

Compound 6
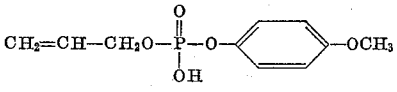

Compound 7
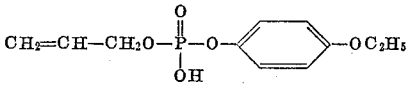

Compound 8
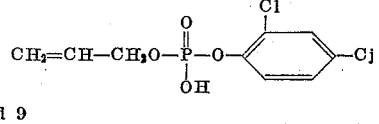

Compound 9
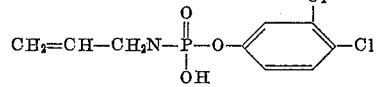

Compound 10
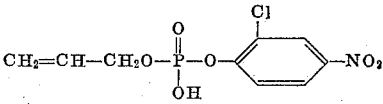

Compound 11
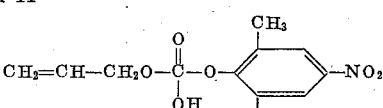

Compound 12
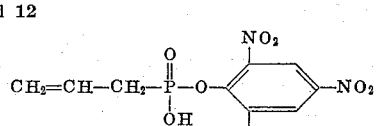

Compound 13
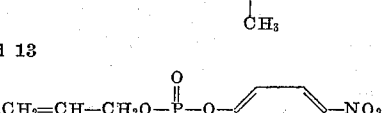

Compound 14

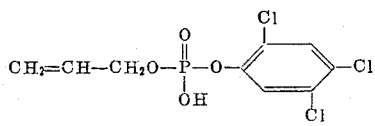

Compound 15

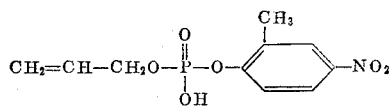

Compound 16

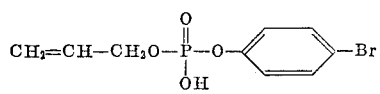

Compound 17

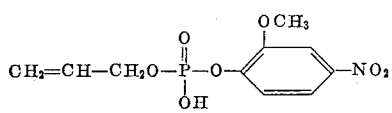

Compound 18

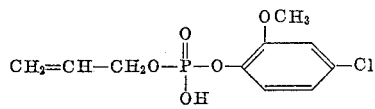

Compound 19

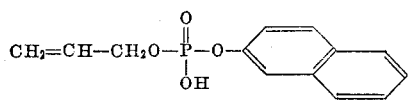

The neutral triester phosphates which serve as the precursors of the diesters of the invention, are in some instances known compounds and are described in the chemical literature. They are commonly obtained by the reaction of a phosphorochloridate with a salt of a phenol. The reaction is carried out at a relatively low temperature, i.e., in the neighborhood of 50° C.

Neutral triester phosphates suitable for practicing the invention are defined by the following general formula:

II 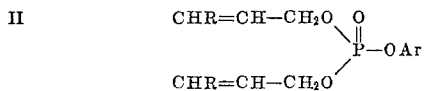

wherein R and Ar have the significance as previously enumerated.

Amine salts, the presence of which facilitates the formation of the acidic diesters, are likewise known entities and can be found in the prior art. Generally excellent results are achieved by using a trialkylamine hydrochloride and, in this connection, mention is made of the lower members of this series, e.g. trimethylamine hydrochloride, triethylamine hydrochloride, etc. Other suitable amine salts are exemplified by the hydrochlorides of cyclic nitrogenous bases in which the nitrogen atoms thereof are in the tertiary state as typified by pyridine, quinoline, isoquinoline, and the like. The acidic diester phosphates of the invention are readily prepared by heating the amine hydrochloride and neutral triester phosphate in a normally liquid relatively inert organic solvent. Suitable reaction media are provided by the aromatic and saturated hydrocarbons such as benzene, toluene, xylene, hexane, heptane, kerosene as well as the chlorinated derivatives thereof.

If desired, it is not necessary to isolate the intermediate neutral triester phosphate from which are derived the acid diesters of the invention. As above pointed out, the triester phosphates are obtained by reacting a phosphorochloridate with a phenol in the presence of a tertiary amine at a temperature below about 50° C. Under these conditions, there is also formed the hydrohalide of the amine. The reaction products are thus a neutral triester phosphate and an amine salt which constitute the requisite starting materials for practicing the process of the invention. The temperature of the reaction mixture is then increased whereby cleavage of the triester is effected with concomitant formation of the desired acid diester phosphate. In general, a temperature above about 100° C. has been found to result in smooth cleavage of the triester.

The new compounds of the invention have been found to possess phytocidal activity and are therefore useful in the formulation of herbicidal compositions for the control of vegetation. They are, moreover, valuable as chemical intermediates in further syntheses through their functional group. Thus, the free OH group can be esterified with a variety of alcohols thereby giving rise to new and useful mixed triester phosphates. Because of the acidic nature of the OH group, the diesters dissolve in alkaline medium and form water soluble salts by replacement of the hydrogen with an ammonium radical, basic metals, e.g. sodium, potassium, barium, calcium, etc. It is to be understood that the salts of the acid diesters are included within the scope of the invention.

Reference is now made to the following examples which are presented for the purpose of illustration only since variations in practicing the invention without departing from the spirit or scope thereof will be apparent to those skilled in the art to which the said invention pertains.

EXAMPLE 1

*Allyl 2-Chloro-4-Nitrophenylphosphoric Acid*

195.5 g. of diallyl phosphorochloridate was added dropwise to a mixture of 173.5 g. of 2-chloro-4-nitrophenol, 101 g. of triethylamine and 400 ml. of toluene. The mixture was thoroughly stirred during the addition and the reaction which was exothermic was maintained at 45–50° C. by external cooling. The triethylamine hydrochloride precipitated out during the course of the reaction. Following addition of the diallyl phosphorochloridate, the mixture was refluxed (110° C.) for 4 hours after which time the temperature had fallen to 92° C., and all of the triethylamine hydrochloride had dissolved. The reaction mixture was poured into water and the organic layer separated, washed with a 5% sodium hydroxide solution and the alkali extract combined with the aqueous filtrate obtained in the first separation. The combined aqueous portions were acidified with concentrated hydrochloric acid and the resultant oily precipitate extracted with chloroform. The extract was dried over anhydrous magnesium sulfate, the dessicant filtered off, and the organic solvent removed by distillation in vacuo, the final temperature being 90° C. at 8 mm. There was obtained a brownish oil having a refractive index of 1.5468. Fractionation of the toluene layer yielded 40 g. of allyl chloride by-product.

The above prepared allyl 2-chloro-4-nitrophenyl phosphoric acid can be converted into its sodium salt by reaction with sodium methoxide in alcoholic solution. The sodium salt is a yellow powder, melting above 250° C.

EXAMPLE 2

*Allyl Pentachlorophenylphosphoric Acid*

This compound was prepared following the procedure given for Example 1 but substituting pentachlorophenol for 2-chloro-4-nitrophenol of the previous example. The resulting diallyl 2-chloro-4-nitrophenylphosphate, on cleavage, yielded a white solid, which, after crystallization from acetone, melted at 164° C. The product corresponded to the above named compound.

The following examples were prepared by procedures patterned after that given for Example 1.

| Example | | Description |
|---|---|---|
| 3 | Allyl 4,6-dinitro-o-cresylphosphoric acid; from diallyl 4,6-dinitro-phenylphosphate. | Brown oil, $N_D^{25}=1.5435$. |
| 4 | Allyl 2-sec. butyl 4,6-dinitrophenylphosphoric acid; from diallyl 2-sec. butyl-4,6-dinitrophenylphosphate. | Brown oil, $N_D^{25}=1.5300$. |
| 5 | Allyl p-nitrophenylphosphoric acid; from diallyl p-nitrophenylphosphate. | Brown oil, $N_D^{25}=1.5384$. |
| 6 | Allyl 2,4,5-trichlorophenylphosphoric acid; from diallyl trichlorophenylphosphate. | Light brown oil, $N_D^{25}=1.5358$. |
| 7 | Allyl phenylphosphoric acid; from diallyl phenylphosphate. | Light brown oil, $N_D^{25}=1.5095$. |

We claim:
1. A method of preparing a diester phosphate as represented by the following general formula:

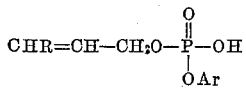

wherein R is selected from the class consisting of hydrogen and lower alkyl and Ar represents an aromatic hydrocarbon residue selected from the class consisting of naphthyl, phenyl and substituted phenyl wherein the substituents are selected from the class consisting of chlorine, lower alkyl, nitro, lower alkoxyl and bromine, which comprises cleaving, in the presence of an amine salt selected from the class consisting of the hydrochlorides of lower trialkylamine and pyridine, a neutral triester phosphate of the following formula

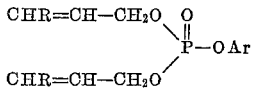

wherein R and Ar have the significance as above set forth and isolating the so-formed diester phosphate from the reaction mixture.

2. The method according to claim 1 wherein the amine salt is triethylamine hydrochloride.

3. The method according to claim 1 wherein the reaction is carried out in the presence of a normally liquid aromatic solvent.

References Cited in the file of this patent
UNITED STATES PATENTS

| | | |
|---|---|---|
| 2,005,619 | Graves | June 18, 1935 |
| 2,488,662 | Farrington et al. | Nov. 22, 1949 |
| 2,508,432 | Smith et al. | May 23, 1950 |
| 2,542,604 | Weisel et al. | Feb. 20, 1951 |
| 2,656,374 | Gamrath | Oct. 20, 1953 |
| 2,674,616 | Morris | Apr. 6, 1954 |
| 2,831,881 | Bell et al. | Apr. 22, 1958 |
| 2,892,751 | Saul | June 30, 1959 |
| 2,922,739 | Snyder | Jan. 26, 1960 |
| 2,952,699 | Norman | Sept. 13, 1960 |
| 3,004,996 | Arakelian et al. | Oct. 17, 1961 |
| 3,027,296 | Whetstone | Mar. 27, 1962 |

UNITED STATES PATENT OFFICE
CERTIFICATE OF CORRECTION

Patent No. 3,157,685

November 17, 1964

Karoly Szabo et al.

It is hereby certified that error appears in the above numbered patent requiring correction and that the said Letters Patent should read as corrected below.

Column 2, lines 38 to 42, Compound 8 should appear as shown below instead of as in the patent:

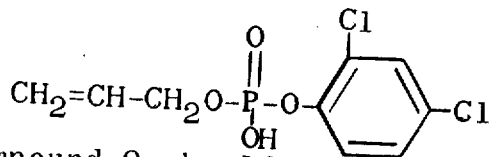

lines 45 to 48, Compound 9 should appear as shown below instead of as in the patent:

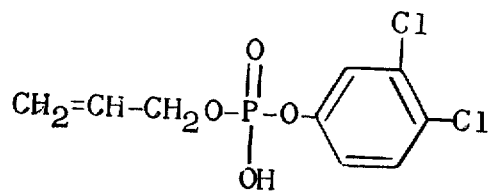

same column 2, lines 55 to 60, Compound 11 should appear as shown below instead of as in the patent:

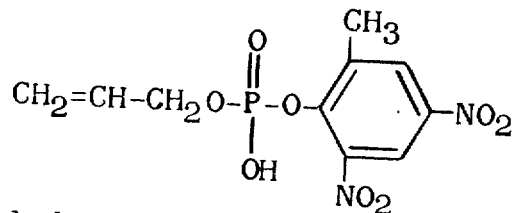

Signed and sealed this 30th day of March 1965.

(SEAL)
Attest:

ERNEST W. SWIDER
Attesting Officer

EDWARD J. BRENNER
Commissioner of Patents